United States Patent [19]
Vizard et al.

[11] Patent Number: 5,830,629
[45] Date of Patent: Nov. 3, 1998

[54] AUTORADIOGRAPHY ASSEMBLAGE USING TRANSPARENT SCREEN

[75] Inventors: Douglas L. Vizard, Chesire, Conn.; David J. Steklenski, Rochester, N.Y.

[73] Assignee: Eastman Kodak Company, Rochester, N.Y.

[21] Appl. No.: 652,401

[22] Filed: May 23, 1996

Related U.S. Application Data

[60] Provisional application No. 60/007,152, Nov. 1, 1995.
[51] Int. Cl.⁶ .................................................. G03C 1/76
[52] U.S. Cl. ............................................ 430/523
[58] Field of Search ............................................ 430/523

[56] References Cited

U.S. PATENT DOCUMENTS

| | | |
|---|---|---|
| 2,303,942 | 12/1942 | Lane et al. . |
| 2,502,529 | 4/1950 | Murray . |
| 2,887,379 | 5/1959 | Blake et al. . |
| 3,300,310 | 1/1967 | Kennard et al. . |
| 3,300,311 | 1/1967 | Kennard et al. . |
| 3,418,246 | 12/1968 | Royce . |
| 3,418,247 | 12/1968 | Yocom . |
| 3,591,516 | 7/1971 | Rabatin . |
| 3,607,770 | 9/1971 | Rabatin et al. . |
| 3,617,285 | 11/1971 | Staudenmayer . |
| 3,617,743 | 11/1971 | Rabatin et al. . |
| 3,666,676 | 5/1972 | Rabatin . |
| 3,725,704 | 4/1973 | Buchanan et al. . |
| 3,743,833 | 7/1973 | Martic et al. . |
| 3,795,814 | 3/1974 | Rabatin et al. . |
| 3,878,119 | 4/1975 | Nath . |
| 3,974,389 | 8/1976 | Ferri et al. . |
| 4,225,653 | 9/1980 | Brixner . |
| 4,311,487 | 1/1982 | Luckey et al. . |
| 4,386,156 | 5/1983 | Mignot . |
| 4,387,141 | 6/1983 | Patten . |
| 4,399,215 | 8/1983 | Jong-Shinn . |
| 4,400,463 | 8/1983 | Maskasky . |
| 4,405,691 | 9/1983 | Yale . |
| 4,414,304 | 11/1983 | Dickerson . |
| 4,414,306 | 11/1983 | Wey et al. . |
| 4,414,310 | 11/1983 | Daubendiek et al. . |
| 4,433,048 | 2/1984 | Solberg et al. . |
| 4,434,226 | 2/1984 | Wilgus et al. . |
| 4,435,501 | 3/1984 | Maskasky . |
| 4,439,520 | 3/1984 | Kofron et al. . |
| 4,499,159 | 2/1985 | Brines et al. . |
| 4,504,570 | 3/1985 | Evans et al. . |
| 4,643,966 | 2/1987 | Maskasky . |
| 4,672,027 | 6/1987 | Daubendiek et al. . |
| 4,693,964 | 9/1987 | Daubendiek . |
| 4,722,886 | 2/1988 | Nottorf . |
| 4,733,090 | 3/1988 | DeBoer et al. . |
| 4,734,581 | 3/1988 | Hashiue .................................. 250/583 |
| 4,801,522 | 1/1989 | Ellis . |
| 4,804,621 | 2/1989 | Tufano et al. . |
| 4,845,369 | 7/1989 | Arakawa et al. .................... 250/484.4 |
| 4,997,750 | 3/1991 | Dickerson et al. . |
| 5,069,982 | 12/1991 | Zegarski . |
| 5,127,038 | 6/1992 | Jeromin et al. . |
| 5,210,014 | 5/1993 | Anderson et al. . |

FOREIGN PATENT DOCUMENTS

| | | |
|---|---|---|
| 0159523 | 10/1985 | European Pat. Off. . |
| 0252820 | 1/1988 | European Pat. Off. . |
| 8707033 | 11/1987 | WIPO . |

OTHER PUBLICATIONS

Res. Disclosure vol. 184, Aug. 1979, Item 18431, Section IX.

*Primary Examiner*—Janet C. Baxter
*Assistant Examiner*—John VanderWilt
*Attorney, Agent, or Firm*—Doreen M. Wells

[57] ABSTRACT

An assemblage useful for autoradiography comprising, in order, a sample layer containing a radioactively labeled biological sample in contact with a phosphor layer, a film layer and a reflector layer. The phosphor layer is preferably a gadolinium oxysulfide containing layer and the film is preferably a photographic film containing a tabular grain emulsion.

6 Claims, 1 Drawing Sheet

AUTORADIOGRAPHY ASSEMBLAGE USING TRANSPARENT SCREEN

CROSS REFERENCE TO RELATED APPLICATION

Reference is made to and priority claimed from U.S. Provisional Application Ser. No. U.S. Ser. No. 60/007,152, filed 01 Nov. 1995, entitled AUTORADIOGRAPHY ASSEMBLAGE USING TRANSPARENT SCREEN.

FIELD OF THE INVENTION

The present invention is directed to the field of recording images made from the detection of biological samples that have been marked with radioactive markers. This field is sometimes referred to as autoradiography.

BACKGROUND OF THE INVENTION

An autoradiograph is a recording of the spatial distribution of radioisotope-labeled substances within a specimen. An autoradiograph is formed when emissions from the radioisotope release energy typically directly or via a light-emitting intensifying screen to sensitive silver halide grains in the emulsion layer or layers of photographic film which form a latent image in the emulsion layer(s). The latent image recorded in the emulsion layer(s) is amplified, fixed and rendered visible by the action of chemical developing and fixing agents. The resulting optical density pattern or visible image can be used to locate and quantify the distribution of the radioisotopes in the specimen which can be used, for example, for nucleic acid sequencing, whole body imaging, and protein blotting.

An inherent difficulty of intensifying screen methodologies as they are conventionally applied in modern biology is that many of the useful radioactive isotopes emit particles that do not easily traverse film; hence, little image enhancement occurs since the particles seldom reach the intensifying screen. Further, the conventional configuration is not applicable to direct electronic capture of the image formed by the excited phosphor screen, since the thick phosphor and backing materials comprising the screen do not transmit light, and the biological samples are usually opaque.

Another limitation of intensifying screen methodologies in medical radiography and X-ray diffraction is that detection sensitivity and spatial resolution of an image are reciprocally related and therefore, screen thickness enhances one at the expense of the other. Hence, sensitivity and spatial resolution are coupled in an adverse relationship.

Further, we have found that the use of the screen in this configuration produces an image on the film that is "mottled". This could be due, for example, to the film being in direct contact with the phosphor which may emit low energy radiation which might expose the film in the very long exposures that are characteristic of the autoradiographic process.

SUMMARY OF INVENTION

The invention comprises a phosphor screen supported on a clear plastic base, which has been optimized as an intensifying screen for use in a transmission configuration. Sample radiation interacts directly with the phosphor, while image capture methods (e.g. either conventional silver halide film or electronic image capture devices) are applied to the other side of the screen. Optimized phosphor and support thickness have been achieved for detection of both high energy and low energy radiation, optimizing the spatial resolution and sensitivity of detection. Further, signal to noise is greatly improved (i.e. mottle is reduced).

Thus, in accordance with the invention, there is provided an assemblage comprising, in order:

a) a sample layer containing a radioactively labeled biological sample in contact with b) a phosphor layer containing a phosphor capable of absorbing the energy given off by said radioactively labeled biological sample to produce light energy; said phosphor layer being carried on a transparent support;

c) and, in contact with the surface of said transparent support opposite that of the phosphor layer, means for recording said light energy.

DETAILED DESCRIPTION OF THE INVENTION

It is noted that in the assemblage of the invention, the beta emitters from the sample excite the phosphor in the phosphor layer. However, the phosphor layer is separated from the means for recording the light energy by the transparent support. The result is that the mottle in the image due to the long exposures mentioned above is substantially eliminated. While not wishing to be bound by any particular theory, it is believed that the transparent support for the phosphor in this configuration absorbs the low level energy that may be emitted directly from the phosphor composition.

As a transmission device, the assemblage of the invention is applicable to both silver halide imaging and direct electronic capture of the image (without film). Thus, in the above description, "means for recording said light energy" includes both conventional silver halide photosensitive film and various electronic image capture methods e.g. CCD arrays and the like.

The invention can be applied to high energy and low energy isotope imaging. For high energy radiation, the assemblage of the invention yields slightly better image quality with the sa me detection sensitivity as conventional screens, but uses screens with substantially less phosphor. For low energy radiation, assemblages of the invention perform very well as image intensifiers, while conventional assemblages cannot be used at all.

Figure 1:
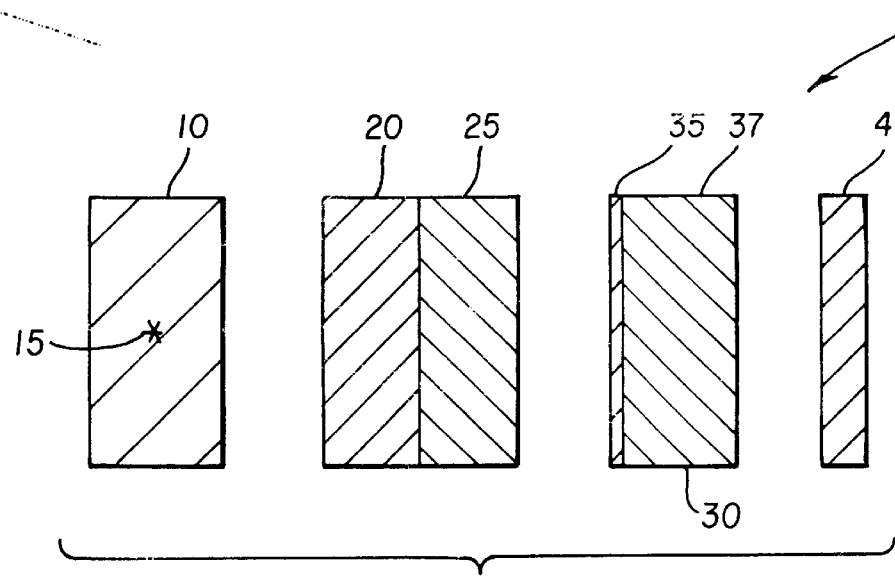
FIG. 1 is a cross sectional representation of an assemblage of the invention (not to scale).

An assemblage 1 of the invention is shown in FIG. 1. (For the purposes of illustration, various elements of the assemblage are shown separated from each other. In practice, these elements are in direct contact. The sample, film, and intensifying screen, are often placed into a cassette, such as an X-ray cassette which has one or more foam backings to provide intimate contact among these elements during the autoradiographic exposure period.) Radioactive emissions from a sample (typically β emitters), interact directly with the phosphor. Most or all of the energy from a β particle is dissipated in the phosphor.

In FIG. I there is shown a sample layer 10. Such a sample layer can be obtained, for example, from an electrophoresis device wherein biological samples are separated by the action of an applied voltage. The biological materials can then be transferred to a suitable absorber, for example a nylon mesh as is known in this art. The biological materials in the sample layer can then be "tagged" with a radioactive isotope so as to form a "radioactively labeled biological sample" 15, in the layer. The sample layer can be formed directly on the surface of the phosphor but is more typically produced separately and then placed onto the phosphor layer. This sample layer 10 is thus placed in contact with a phosphor layer 20 which is carried on a transparent support 25. This transparent support is then placed in contact with a means for recording light emitted from the phosphor, in FIG. 1 a photographic film represented by 30 including a photosensitive emulsion layer 35 and a support 37. On the support side of the photographic film there can be optionally placed a reflective layer, illustrated in FIG. 1 by 40. Exposures can be made at room temperature or at −70° C. (for exposure times that require several days). The low temperature stabilizes the latent image and prevents low intensity reciprocity failure of the film.

Figure 2:
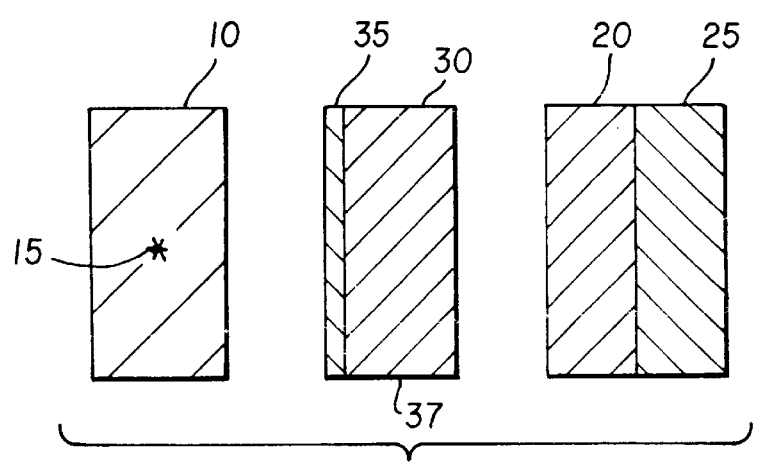
FIG. 2 is a cross sectional representation of an assemblage of the prior art. (also not to scale).

In contrast, an assemblage according to the prior art is shown in FIG. 2. Again, 10 represents a sample layer with a radioactively labeled biological sample 15. In the case of the prior art, the sample layer is in contact with the photosensitive film 30 including the photosensitive emulsion layer 35 and support 37. The phosphor layer 20 is in contact with the film 30. Ionizing radiation from the radiolabelled biological sample 15 must travel through the film support 37 to the phosphor layer 20 and then light from the phosphor layer 20 is then recorded by the film 30.

The term "sample layer" used herein means the specimen to which the radioisotope has been added and the material onto which the specimen and radioisotope is mounted on or in, such as filter paper, nylon web, glass slides, plastic slides, acrylamide gel or plastic wrap.

This optional reflective layer 40 can be, for example, a vacuum evaporated metal on a flexible support. Alternatively, the optional reflective layer can be a support that is filled with a reflector, such as titanium dioxide or a support that is coated with a reflective titanium dioxide or other reflector such as barium sulfate. The currently preferred reflective layer is a support having first a vacuum evaporated layer of aluminum followed by a vacuum evaporated layer of silicon dioxide to provide abrasion resistance. In a particularly preferred configuration, there is provided a phosphor screen on a transparent support that is attached to a reflective sheet along one edge with a flexible hinge such as tape. In this configuration, it is convenient to slip a piece of photographic film between the screen and the reflective sheet. A sample is then placed in contact with the phosphor layer so as to produce an assemblage of the invention.

The types of specimens for which autoradiographic imaging is performed include, for example, nucleic acids, whole body sections, proteins, plants and other specimen materials in chromatographic adsorbents, acrylamide and agrose gels. Common types of tests for which autoradiography is performed include DNA Sequencing, Southern Blotting, Northern Blotting and Library Screening.

The specimens may be wet or dry. If the specimens are wet, they should be wrapped in some kind of thin, waterproof material like plastic wrap to prevent the film from getting wet.

The type of radioisotope added to a sample effects the selection of the embodiment of the method of autoradiographic imaging. Different radioisotopes emit different types of radiation, and different levels of energy of radiation.

Typical radioisotopes are shown below:

| ISOTOPE | HALF-LIFE | | RADIATION | ENERGY |
|---|---|---|---|---|
| $^3H$ | 12.3 | Years | Beta | 0.018 MeV max |
| $^{14}C$ | 5730 | Years | Beta | 0.156 MeV max |
| $^{35}S$ | 88 | Days | Beta | 0.167 MeV max |
| $^{45}Ca$ | 165 | Days | Beta | 0.256 MeV max |
| $^{32}P$ | 14.3 | | Beta | 1.710 MeV max |
| $^{125}I$ | 60 | Days | Gamma | 0.035 MeV |
| | | | X-Ray | 0.027 MeV |
| | | | Electron | 0.030 MeV |

In one embodiment, the assemblage of the invention is optimized for the detection of high energy radiation and the phosphor layer is sufficiently thick to match the 32p detection efficiency of the phosphor in the conventional configuration. For example, where the phosphor is gadolinium oxysulfide activated with terbium, phosphor coverages in the range of about 40–100 $g/ft^2$ are useful. Where the phosphor is another material, suitable coverages can be easily determined by one of skill in the art.

The assemblage can also be optimized for low energy radiation and in this embodiment, can be optimized on the basis of 35S imaging. This requires much less phosphor to achieve maximum sensitivity, and a thinner plastic support is used to maintain the best spatial resolution possible. A phosphor overcoat for the low energy detecting embodiment can also be optimized for 35S imaging and is thin enough not to impact detection sensitivity, yet thick enough to render modest protection. The low energy embodiment is capable of enhancing ultra-low energy radiation ($^3H$). For example, where the phosphor is gadolinium oxysulfide, phosphor coverages in the range of about 10–30 $g/ft^2$ are useful. Where the phosphor is another material, suitable coverages can be easily determined by one of skill in the art.

A thin overcoat of polymer (for example an acrylic polymer or cellulose acetate) can be coated on the phosphor layer. The overcoat may be transparent or may contain a dye so as to provide customer convenience in that with the dye present, there is contrast between the sample and the phosphor screen surface. Such a overcoat will help prevent stray light artifacts from interfering with the image capture process, without seriously impacting low-energy β or X-ray detection. Within the meaning of the present invention, the sample layer is still in contact with the phosphor layer in spite of the presence of this thin overcoat.

The plastic backing material used can be clear poly (ethylene terephthalate) ranging from about 0.002–0.007 inches thick. The support need only be thick enough to provide adequate support for the phosphor layer. Where thick phosphor layers are needed, supports on the thicker end of the described range are used. Where less phosphor is needed, supports on the thinner end of the range can be used. Other conventional transparent support materials can also be used such as acetate base or poly(methyl methacrylate). The range of protective overcoats can be from about 0.2–3 micrometers of polymer.

As noted previously, the "means for recording light energy" can be photographic film. Currently preferred photographic film is described in commonly assigned copending U.S. application Ser. No. 08/268,753 filed Jun. 30, 1994 in the names of Dickerson et al and entitled METHOD OF AUTORADIOGRAPHIC IMAGING. That application describes the use of tabular silver halide grain containing films for autoradiography. One commercially available film of this type is BioMax® available from Eastman Kodak Company, Rochester, N. Y. A wide range of other films can also be used.

Thus, the preferred film used in the method of this invention has at least one high aspect ratio tabular grain emulsion. The film can be either single- or double-coated, but is preferably a single-coated film. The high aspect ratio tabular grain silver halide emulsions are comprised of a dispersing medium and tabular silver halide grains. As applied to the silver halide emulsions the term "high aspect ratio" is herein defined as requiring that the silver halide grains having a thickness of less than 0.3 micron and a diameter of at least 0.6 micron have an average aspect ratio of greater than 6:1 , preferably 8:1 and account for at least 50 percent of the total projected area of the silver halide grains. The preferred high aspect ratio tabular grain silver halide emulsions of the present invention are those wherein the silver halide grains having a thickness of less than 0.3 micron (optimally less than 0.2 micron) and a diameter of at least 2 microns have an average aspect ratio of at least 12:1 . Preferably the grains have a minimum diameter of 4 microns and an average aspect ratio of at least 12:1, more preferably at least 20:1 , most preferably at least 30:1 . In a preferred form of the invention these silver halide grains satisfying the above thickness and diameter criteria account for at least 70 percent and optimally at least 90 percent of the total projected area of the silver halide grains.

The grain characteristics described above of the silver halide emulsions used in this invention can be readily ascertained by procedures well known to those skilled in the art. As employed herein the term "aspect ratio" refers to the ratio of the diameter of the grain to its thickness. The "diameter" of the grain is in turn defined as the diameter of a circle having an area equal to the projected area of the grain as viewed in a photomicrograph or an electron micrograph of an emulsion specimen. From shadowed electron micrographs of emulsion specimens it is possible to determine the thickness and diameter of each grain and to identify those tabular grains having a thickness of less than 0.3 micron and a diameter of at least 0.6 micron. From this the aspect ratio of each such tabular grain can be calculated, and the aspect ratios of all the tabular grains in the specimen meeting the less than 0.3 micron thickness and at least 0.6 micron diameter criteria can be averaged to obtain their average aspect ratio. By this definition the average aspect ratio is the average of individual tabular grain aspect ratios. In practice it is usually simpler to obtain an average thickness and an average diameter of the tabular grains having a thickness of less than 0.3 micron and a diameter of at least 0.6 micron and to calculate the average aspect ratio as the ratio of these two averages. Whether the averaged individual aspect ratios or the averages of thickness and diameter are used to determine the average aspect ratio, within the tolerances of grain measurements contemplated, the average aspect ratios obtained do not significantly differ. The projected areas of the tabular silver halide grains meeting the thickness and diameter criteria can be summed, the projected areas of the remaining silver halide grains in the photomicrograph can be summed separately, and from the two sums the percentage of the total projected area of the silver halide grains provided by the tabular grains meeting the thickness and diameter criteria can be calculated.

In the above determinations a reference tabular grain thickness of less than 0.3 micron was chosen to distinguish the uniquely thin tabular grains herein contemplated from thicker tabular grains which provide inferior autoradiographic properties. A reference grain diameter of 0.6 micron was chosen, since at lower diameters it is not always possible to distinguish tabular and nontabular grains in micrographs. The term "projected area" is used in the same sense as the terms "projection area" and "projective area" commonly employed in the art; see, for example, James and Higgins, *Fundamentals of Photographic Theory,* Morgan and Morgan, New York, p. 15.

Examples of high aspect ratio tabular grain emulsions and the processes for making them are specifically disclosed by Wilgus et al., U.S. Pat. No. 4,434,226; Daubendiek et al., U.S. Pat. No. 4,414,310; Wey, U.S. Pat. No. 4,399,215; Solberg et al., U.S. Pat. No. 4,433,048; Kofron et al., U.S. Pat. No. 4,439,520; Mignot, U.S. Pat. No. 4,386,156; Evans et al., U.S. Pat. No. 4,504,570; Maskasky, U.S. Pat. No. 4,400,463; Wey et al., U.S. Pat. No. 4,414,306; Maskasky, U.S. Pat. No. 4,435,501 and 4,643,966; and Daubendick et al., U.S. Pat. Nos. 4,672,027 and 4,693,964; Dickerson et al, U.S. Pat. No. 4,997,750; Nottorf, U.S. Pat. 4,722,886; Ellis, U.S. Pat. No. 4,801,522; Dickerson, U.S. Pat. Nos. 4,414, 304; and Tufano et al, 4,804,621, all of which arc incorporated herein by reference.

Spectral sensitizing dyes can be incorporated into the emulsion layers of the film and are chosen to exhibit an absorption peak in a region of the spectrum corresponding to the wavelength of electromagnetic radiation to which the film is being exposed from the radioisotopes, autographic imaging substances, the phosphors of the intensifying screens or various combinations of the above. The preferred phosphor is gadolinium oxysulfide and therefore the preferred spectral sensitizing dyes sensitize the grains to green light. Such green sensitizing dyes include tricarbocyanine dyes, and benzimidazolocarbocyanine dyes. The latter dyes are disclosed in U.S. Pat. No. 5,210,014 incorporated herein by reference. Additionally, there are dyes that sensitize to blue for use with blue-light emitting screens. These dyes can include monocarbocyanine and merocyanine dyes. Such gadolinium oxysulfide screens are disclosed in Nath, U.S. Pat. No. 3,878,119 and Buchanan et al, U. S. Pat. No. 3,725,704 which are incorporated herein by reference. However, it is also useful in the method of this invention to spectrally sensitize the film to blue light and use the film with blue-light emitting screens such as lanthanum oxybromide and calcium tungstate phosphor screens.

The intensifying screens can take any convenient form and although the gadolinium oxysulfide screen is preferred, any intensifying screen that produces satisfactory levels of light emission can be used in the method of this invention with or without films that are spectrally sensitized. Examples of intensifying screens useful in the method of this invention are those disclosed in Research Disclosure, Vol. 184, Aug. 1979, Item 18431, Section IX, incorporated herein by reference. Intensifying screens used in the assemblages of the invention consist of a transparent support. A fluorescent layer is coated on the support containing a phosphor and a binder. Light absorbers such as carbon, pigments, or dyes, and light scattering agents such as titania can be employed to tailor the speed and/or sharpness of screen emission.

Examples of useful intensifying screens are those having a fluorescent layer comprised of a phosphor chosen from rare earth oxychalcogenide and halide phosphors of the formula:

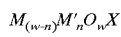

wherein:
  M is at least one of yttrium, lanthanum, gadolinium, or lutetium;
  M' is at least one of dysprosium, erbium, europium, holmium, neodymium, praseodymium, samarium, terbium, thulium, or ytterbium;

X is a middle chalcogen (S, S o, or Te) or halogen;

n is 0.0002 to 0.2; and w is 1 when X is halogen or 2 when X is chalcogen.

Other specifically preferred phosphors include calcium tungstate, niobium-activated or thulium-activated yttrium tantalate, and terbium-activated gadolinium or lutetium oxysulfide.

Calcium tungstate phosphors are illustrated by Wynd et al in U.S. Pat. No. 2,303,942. Niobium- activated and rare earth activated yttrium, lutetium and gadolinium tantalates are disclosed by Brixner in U.S. Pat. No. 4,225,653. Rare earth activated gadolinium and yttrium middle chalcogen phosphors are taught by Royce in U.S. Pat. No. 3,418,246. Rare earth activated lanthanum and lutetium middle chalcogen phosphors are illustrated by Yocom in U.S. Pat. No. 3,418,247. Terbium-activated lanthanium, gadolinium and lutetium oxysulfide phosphors are disclosed by Buchanan et al in U.S. Pat. No. 3,725,704 and Nath in U.S. Pat. No. 3,878,119. Cerium activated lanthanum oxychloride phosphors are taught by Swindells in U.S. Pat. No. 2,729,604. Terbium activated and optionally cerium activated lanthanum and gadolinium oxyhalide phosphors are disclosed by Rabatin in U.S. Pat. No. 3,617,743 and Ferri et al in U.S. Pat. No. 3,974,389. Rare earth activated rare earth oxyhalide phosphors are disclosed by Rabatin in U.S. Pat Nos. 3,591, 516 and 3,607,770. Terbium activated and ytterbium activated rare earth oxyhalide phosphors are disclosed by Rabatin in U.S. Pat. No. 3,666,676. Thulium activated lanthanium oxychloride or oxybromide phosphors are illustrated by Rabatin in U.S. Pat. No. 3,795,814. A $(Y,Gd)_2O_2S:Tb$ phosphor wherein the ratio of yttrium to gadolinium is between 93:7 and 97:3 is illustrated by Yale in U.S. Pat. No. 4,405, 691. Non-rare earth co-activators can be employed as illustrated by bismuth and ytterbium activated lanthanum oxychloride phosphors disclosed by Luckey et al in U.S. Pat. No. 4,311,487. The mixing of phosphors as well as the coating of phosphors in separate layers of the same screen are specifically recognized. A phosphor mixture of calcium tungstate and yttrium tantalate is disclosed by Patten in U.S. Pat. No. 4,387,141. Activated lanthanum oxyhalide e.g. thulium, etc. phosphors are made by methods described in Brine et al, U.S. Pat. No. 4,499,159. A phosptantalate and lanthanu tantalate and lanthanum oxyhalide phosphors is described in Zegarski, U.S. Pat. No. 5,069,982. An additional intensifying screen reference includes DeBoer et al, U.S. Pat. No. 4,733,090. All the patents and disclosures cited above are incorporated herein by reference.

While it is recognized that the phosphor layers need not contain separate binders, in most applications the phosphor layers contain sufficient binder to provide structural coherence to the phosphor layer. In general, the binders useful in the practice of the invention are those conventionally employed in the art. Binders are generally chosen from a wide variety of known polymers which are transparent to X-radiation and emitted light. Binders commonly employed in the art include sodium o-sulfobenzaldehyde acetal of poly(vinyl alcohol), chlorosulfonated polyethylene; a mixture of macromolecular bisphenol polycarbonates and copolymers comprising bisphenol carbonates and poly (alkylene oxides); aqueous ethanol soluble nylons; poly (alkyl acrylates and methacrylates) and copolymers of poly (alkyl acrylates and methacrylates) with acrylic and methacrylic acids; poly(vinyl butyral); and polyurethane elastomers. These and other useful binders are disclosed in U.S. Pat. Nos. 2,502,529; 2,887,379; 3,617,285; 3,300,310; 3,300,311 and 3,743,833, and in *Research Disclosure*, Vol. 154, February, 1977, Item 15444, and Vol. 182, June, 1979. *Research Disclosure*, incorporated herein by reference. Particularly preferred binders are polyurethanes, such as those commercially available under the trademark "Estane" from Goodrich Chemical Co., and under the trademark "Permuthane" from A. H. Stahl.

Figure 3:
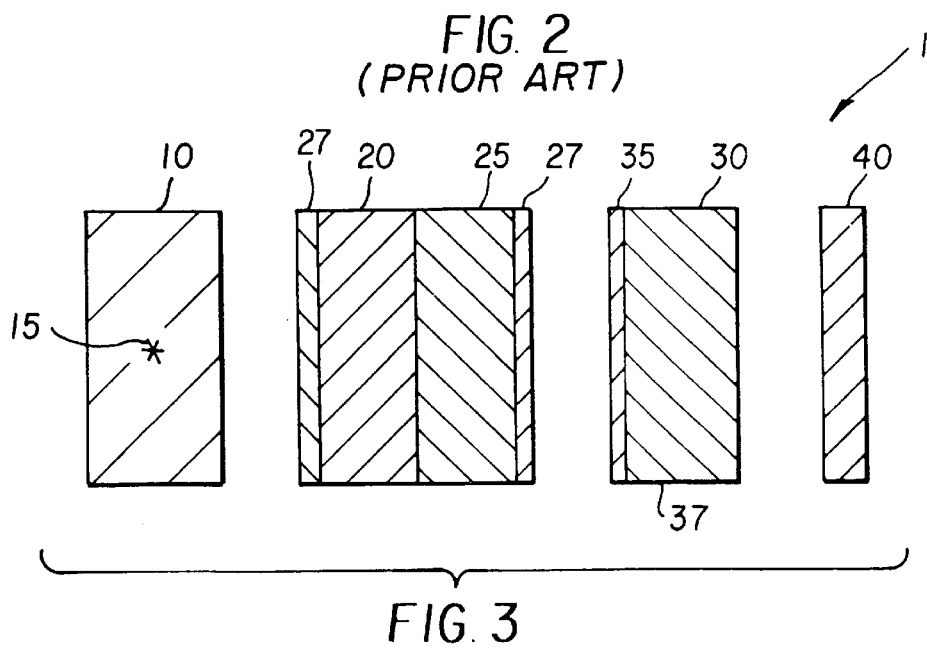
FIG. 3 is a cross sectional representation of an assemblage of the invention using transparent conductive layers on either side of the phosphor layer (also not to scale).

The diagram in FIG. 3 presents a method of intensifying the image produced by a phosphor screen by multiplying the ionizations that lead to phosphor emissions.

In FIG. 3, the reference numerals have the same meaning as in FIG. 1. In addition, there is shown transparent conductive layers 27 on either side of the phosphor layer. These transparent conductive layers can be, for example, vacuum evaporated indium tin oxide or cuprous oxide layers.

If a screen is non-conductive, it is practical to apply as much as 1000 volts across a 0.1 mm screen, without a deleterious consequence. Experimental observations show that gadolinium oxysulfide phosphor is a nonconductor. A field of 10000 V/mm applied to a 0.1 mm phosphor would contribute as much as 1 Kev to the average 50ev electron, which is likely to contribute to the production of other electrons by secondary ionization and increase the phosphor emission/efficiency.

In a preferred embodiment, it is desirable to apply the field to only the phosphor, since that would be practical, safe and without discharge artifacts expected from contaminated materials (such as film that has been handled). In addition, the results would be more interpretable, since the phosphor would possess a single dielectric constant; hence, the applied field would be better known. If the dielectric constants of all differing materials between the aluminum foil poles of FIG. 3 are the same, the field applied to the phosphor can be estimated from the known (approximate) thicknesses. The phosphor has a much higher dielectric constant than the plastic support and film. The applied field causes an increase in the sensitivity of detecting ionizing radiation using a phosphor enhanced film capture methodology.

For high energy radiation, the conductive overcoat between the sample and the phosphor could be several micrometers thick without seriously impacting detection efficiency. Such an overcoat would be opaque to light in the visible and UV spectrum and may permit ambient light applications.

Previously addressed are the overcoat compositions that may reduce stray light exposure of film (or electronic devices) during image capture. Such would be an application enhancement. Should an overcoat be several micrometers of conductor, the expanded application of ambient light autoradiography are possible.

The invention has been described with reference to the preferred embodiments. The spirit and scope of the appended claims should not be limited to the description of the preferred versions contained herein.

We claim:

1. An assemblage comprising, in order:
   a) a sample layer containing a radioactively labeled biological sample in contact with
   b) a phosphor layer containing a phosphor selected from rare earth oxychalcogenide and halide phosphors of the formula:

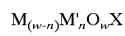

$$M_{(w-n)}M'_nO_wX$$

wherein:
   M is at least one of yttrium, lanthanum, gadolinium, or lutetium;
   M' is at least one of dysprosium, erbium, europium, holmium, neodymium, praseodymium, samarium, terbium, thulium, or ytterbium;

X is a middle chalcogen (S, Se, or Te) or halogen;

n is 0.0002 to 0.2; and w is 1 when X is halogen or 2 when X is chalcogen; said phosphor being capable of absorbing the energy given off by said radioactively labeled biological sample to produce light energy; said phosphor layer being carried on a transparent support;

c) in contact with the surface of said transparent support opposite that of the phosphor layer, means for recording said light energy; and d) a reflector layer.

2. An assemblage comprising, in order:

a) a sample layer containing a radioactively labeled biological sample in contact with b) a phosphor layer containing a phosphor selected from calcium tungstate, niobium-activated and thulium-activated yttrium tantalate, terbiumactivated gadolinium and lutetium oxysulfide capable of absorbing the energy given off by said radioactively labeled biological sample to produce light energy; said phosphor layer being carried on a transparent support;

c) in contact with the surface of said transparent support opposite that of the phosphor layer, means for recording said light energy; and d) a reflector layer.

3. An assemblage according to claim 1 or 2 wherein said means for recording said light energy is photographic film.

4. An assemblage according to claim 1 or 2 wherein said phosphor layer is between two conductive layers.

5. An assemblage according to claim 1 or 2 wherein said phosphor is gadolinium oxysulfide: terbium.

6. An assemblage according to claim 1 or 2 wherein said phosphor layer has a protective overcoat.

* * * * *